United States Patent
Shahsavari

(10) Patent No.: US 11,180,414 B1
(45) Date of Patent: Nov. 23, 2021

(54) SYNTHESIS OF CEMENTLESS FLY ASH BASED BINDERS AND APPLICATIONS THEREOF

(71) Applicant: C-CRETE TECHNOLOGIES, LLC, Stafford, TX (US)

(72) Inventor: Rouzbeh Shahsavari, Houston, TX (US)

(73) Assignee: C-Crete Technologies, LLC, Houston, TX (US)

( * ) Notice: Subject to any disclaimer, the term of this patent is extended or adjusted under 35 U.S.C. 154(b) by 152 days.

(21) Appl. No.: 16/562,247

(22) Filed: Sep. 5, 2019

Related U.S. Application Data

(60) Provisional application No. 62/727,283, filed on Sep. 5, 2018.

(51) Int. Cl.
  *C04B 28/02* (2006.01)
  *C04B 14/06* (2006.01)
  *C04B 14/30* (2006.01)
  *C04B 14/04* (2006.01)
  *C04B 22/00* (2006.01)
  *C04B 14/02* (2006.01)
  *C04B 111/10* (2006.01)

(52) U.S. Cl.
  CPC .......... *C04B 28/021* (2013.01); *C04B 14/022* (2013.01); *C04B 14/045* (2013.01); *C04B 14/062* (2013.01); *C04B 14/30* (2013.01); *C04B 22/002* (2013.01); *C04B 2111/1037* (2013.01)

(58) Field of Classification Search
  CPC ... C04B 14/022; C04B 14/045; C04B 14/062; C04B 14/30; C04B 22/002; C04B 28/021; C04B 2111/1037
  See application file for complete search history.

(56) References Cited

U.S. PATENT DOCUMENTS 10,047,270 B2 * 8/2018 Pisklak ................ C04B 22/147

* cited by examiner

*Primary Examiner* — Anthony J Green
(74) *Attorney, Agent, or Firm* — Gregory L. Porter; Hunton Andrews Kurth LLP

(57) ABSTRACT

Novel binder compositions have been discovered that offer an alternative to Portland Cement and reduced carbon dioxide footprint. The compositions typically include the reaction product of a mixture of fly ash, calcium oxide, nano-silica, water, and an effective amount of an activator. The 7, 14, and/or 28 day compressive strength may be at least about 15 MPa or more in some embodiments.

18 Claims, 8 Drawing Sheets

SYNTHESIS OF CEMENTLESS FLY ASH BASED BINDERS AND APPLICATIONS THEREOF

CROSS-REFERENCE TO RELATED APPLICATIONS

The instant application claims priority to provisional application Ser. 62/727,283 filed on Sep. 5, 2018 which is incorporated herein by reference.

BACKGROUND AND SUMMARY OF THE INVENTION

Despite the myriad of research efforts on exploiting fly ash as an alternative binder, its current role in industry is largely restricted to the supplementary use, which enables only partial replacement of conventional portland cement. Herein, we propose an unprecedented binder composite with the promising early-age strength, which is cost-effective and reduces the $CO_2$ footprint compared with portland cement. The major constituent is fly ash occupying 76.4%-80.3% by the total mass of the constituents, while calcium oxide, nanosilica, and the minimum amounts of sodium-based activators are added to induce the early-age strength development. Optimization of the composition via the Taguchi design of experiments produced the early (7-day) compressive strength of 16.18 MPa. This value is encouraging considering that it is comparable to that of conventional portland cement and that a cementless composition with the minimum amounts of sodium-based activators was employed. The extensive materials analysis demonstrates that the starting Ca/Na molar ratio and the amount of nanosilica play instrumental roles in strength development by influencing the formation of key reaction products, which include the sodium-substituted AFm phase (the U-phase), katoite and portlandite. Overall, the promising strength coupled with the significantly decreased amount of sodium-based chemicals and the reduced $CO_2$ footprint will lay a foundation for development of low-cost, environmentally friendly binder in diverse industries.

DETAILED DESCRIPTION OF THE INVENTION

Figure 1:
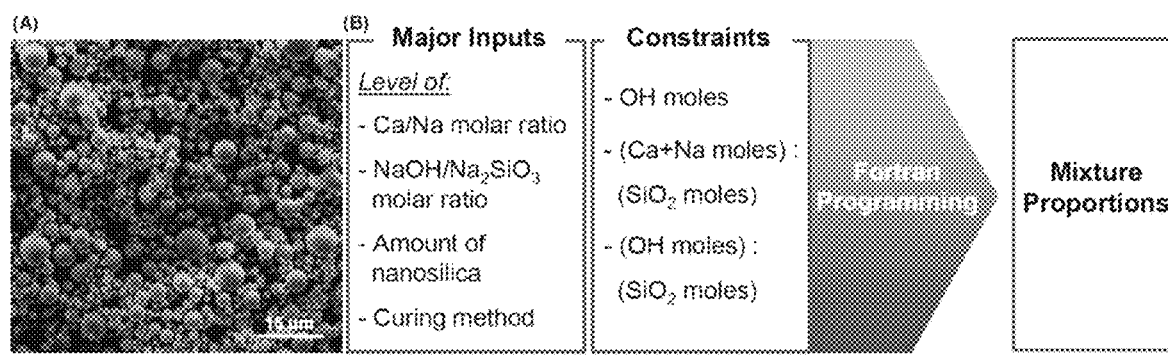
FIG. 1A is an SEM image of raw Type-C fly ash particles.
FIG. 1B is a basic outline of the computational approach adopted for generating the mixture proportions, which satisfy the levels of the variables.

Calcium silicate-based materials are now ubiquitous in a wide range of industries including cementitious infrastructures, insulation and refractory materials and bone-tissue engineering and consequently, they have been subjected to the active experimental and computational research over the past decades. (See, e.g., References 1-9). The annual production of portland cement in particular, the most common calcium silicate-based precursor, reaches around 4200 million metric tons worldwide. (See, e.g., Reference 10). This not only underlies the significant environmental footprint, contributing to 5%-10% of the global carbon dioxide emissions (see, e.g., Reference 11), but also renders itself the most energy intensive of manufacturing industries. (See, e.g., Reference 12). Consequently, there are active research efforts directed towards enhancing the mechanical durability of concretes via bottom-up engineering, which can ultimately reduce the production of portland cement. (See, e.g., References 13-15). In addition, a plethora of research efforts has been devoted to developing an alternative binder using industrial waste encompassing blast-furnace slag, rice husk, and fly ash. (See, e.g., References 16-18). Among these candidates, fly ash has repeatedly verified its ability to serve as the optimum long-term replacement for conventional cement, owing to its chemical composition, which is highly rich in silicon and aluminum ions. These ions can be hydrolyzed and serve as the fundamental building blocks of a mechanically durable geopolymer.

Fly ash is the major waste product from coal combustion, renowned for its low price and enormous availability worldwide, with its production being projected to reach 54.6 million tons in 2033 only in the US. (See, e.g., Reference 19). It is typically divided into 2 types, low calcium, Type-F fly ash (FA-F), produced from anthracite or bituminous coals, and high calcium, Type-C fly ash (FA-C), produced from lignite or sub-bituminous coals. Both types are now established as supplementary cementitious materials (SCM) in construction industry offering numerous benefits including enhanced durability, workability, late strength gain, and reduced material cost. (See, e.g., References 20-22). However, despite the widespread use as SCM which partially replaces cement in a concrete design, the "complete" replacement would be highly desired but extremely challenging to solve the environmental concerns raised by the production of cement. Currently, the proportion that fly ash occupies in typical concrete mix design is around 20 wt % of the total amount of cementitious materials. (See, e.g., References 23 and 24). Replacement level up to 40-60 wt % produces a high-volume fly ash (HVFA) concrete with slower strength development. On the other hand, if fly ash was to be applied as the sole source of binder with sufficient mechanical properties, it must be exploited as the source of geopolymer, necessitating the use of alkaline sodium-based chemicals for activation. This has been verified by the majority of previous studies, which all demonstrated the significant reliance on using high concentrations of sodium hydroxide or waterglass to accomplish high compressive strengths. (See, e.g., References 25 and 26). Overall, the use of expensive sodium-based activators is the major impeding factor, which prevents further widespread commercialization of fly ash as the precursor for cement-free binder. It hampers the benefit-cost ratio and also, may induce safety issues arising from high toxicity. (See, e.g., References 27-29). Consequently, there must be alternative methods for activation, which are low-cost, environmentally friendly and involve zero or reduced amount of sodium-based activators. (See, e.g., Reference 27).

In the light of increasing demands for diverse, sodium-free activators, calcium-based materials such as calcium hydroxide and calcium oxide have demonstrated the notable capability in activating fly ash. (See, e.g., References 27 and 28). Numerous studies have adopted the above-mentioned limes to activate FA-F in place of the sodium-based activators and acquired the notable mechanics through the formation of calcium aluminosilicate hydrate (C-A-S—H) coexisting with sodium aluminosilicate hydrate (N-A-S—H), the geopolymer gel. (See, e.g., References 28 and 30). Jeon et al (see, e.g., Reference 28), applied calcium hydroxide along with $Na_2CO_3$ to activate fly ash and accomplished the compressive strengths reaching over 30 MPa by 28-days. Nevertheless, they have rarely been applied to FA-C, which already possesses high calcium content. Antiohos et al (see, e.g., Reference 30), applied quicklime for high-calcium fly ash and saw that it affects the porosity of the resultant sample but the overall dosage was kept within 3 wt % of the total cementitious materials. Therefore, applying calcium oxide beyond 10 wt % by the total mass of constituent materials, when high calcium fly ash is the major source of binder has never been witnessed due to the conventional limit of the total CaO content.

In this study, we introduce a novel composite design, which mainly consists of high calcium fly ash coupled with calcium oxide, nanosilica and the unprecedentedly reduced amount of sodium-based activators. More precisely, the design comprises 5 major constituents, fly ash, calcium oxide, nanosilica, sodium hydroxide, and sodium metasilicate pentahydrate. The similar combination of fly ash with lime and sodium-based activators has been previously reported but only with low calcium fly ash and also, with the early age strength not as high as that reported in our study. (See, e.g., References 31 and 32). Herein, the usage of multiple components resulted in the formation of different crystalline products and optimizing the composition via the Taguchi method produced the early-age compressive strength of 16.18 MPa, comparable to the value for portland cement. The statistical/sensitivity analysis confirmed that the starting Ca/Na molar ratio and the amount of nanosilica serve as the two most influential factors on the strength development. Furthermore, the rigorous microstructural analysis revealed that the effects from the aforementioned factors arise from their control over the formation of major reaction products, including the sodium substituted AFm phase known as the U-phase, katoite, calcium silicate hydrate (C—S—H), and portlandite. Overall, the extensive optimization, evaluation, and post-analysis of the new binder composition will create a novel platform for fabricating the low cost, environmentally friendly binder for various applications.

Examples

Materials

FA-C used in this research was purchased from Headwaters Resources (Collected at the W.A Parish Plant in Texas) without prior treatment. Its chemical composition, acquired using X-ray fluorescence according to ASTM C-618-15 confirmed 25.4% of calcium oxide, which satisfies the typical high calcium content of FA-C (Table 1). Its raw particles exhibit a narrow distribution in spherical morphology with few irregular shapes (FIG. 1A). Calcium hydroxide, purchased from Sigma Aldrich, was calcined in our laboratory at 1000° C. for 1012 hours for its chemical conversion into calcium oxide. Sodium hydroxide provided in the pellet form (Fisher Scientific) and sodium metasilicate pentahydrate (Alfa Aesar) containing 28.2%-29.2% $SiO_2$ and 28.6%-29.6% $Na_2O$, were used to produce liquid, sodium-based activator solutions. Separate solutions of sodium hydroxide and sodium silicate pentahydrate were first prepared using the amounts according to our predesigned mixture proportion for each experiment and were later mixed together for use. Nanosilica, also named as silicon (IV) oxide, with the particle size of 0.012 micron, was purchased from Strem Chemicals.

TABLE 1

Chemical composition of type-C fly ash employed in this study (%)

| $SiO_2$ | $Al_2O_3$ | $Fe_2O_3$ | CaO | MgO | $SO_3$ | $Na_2O$ | $K_2O$ | L.O.I |
|---|---|---|---|---|---|---|---|---|
| 36.41 | 18.8 | 5.49 | 25.42 | 5.33 | 2.17 | 1.66 | 0.5 | 0.6 |

Preparation of Cubic Specimen

FA-C, calcium oxide and nanosilica were dry mixed thoroughly without liquid solutions of sodium hydroxide and sodium metasilicate pentahydrate to prevent agglomeration of solid particles in the final mixture. This premixing process was performed in a fume hood and with extremely gentle force in order to minimize the dispersion of nanosilica into the air. After the sodium-based activator solutions were slowly added, the entire mixture was mixed for another 3 minutes until the uniform paste was formed. The as-prepared paste was cast in 50×50×50 mm cubic molds in 2 consecutive steps, with each step involving pouring followed by tapping and vibration to minimize the number of unnecessary air voids within the specimen. The molds were either sealed in a plastic bag and directly placed in an oven set at 60° C. or left at an ambient condition for 24 hours first before curing under heat, in accordance with the conditions set in the Taguchi design, which will be introduced later.

Strength Evaluation

In some embodiments seven-day compressive strength was selected as the evaluation factor for the early-age strength in our present research. Compressive strength was measured on the 7th day from the first creation of the specimen by, for example, using an Instron 4505 machine set up with the 100 kN load cell. Three specimens were tested for each sample at the uniaxial loading rate of 0.5 mm/min and the average value of compressive strength was calculated with regard to the applied force and cross-sectional area of the specimen.

Characterization

The samples prepared for materials characterization were immersed in acetone on the $7^{th}$ day of curing and stored for 2 weeks to halt further hydration. Acetone was replaced with new acetone with the interval of 3 days. The samples were then dried shortly at room temperature first, crushed to fine powders using a pestle and mortar and subsequently, filtered using a 100 μm sieve. The filtered particles were dried further at 40° C. for 10 minutes and used immediately for characterization to prevent carbonation.

The X-ray diffraction (XRD) patterns were acquired using a Rigaku D/Max Ultima 2 Powder XRD 1s with Cu Kα radiation using the step size of 0.02° with the count time of 15 seconds. Postprocessing of the diffraction patterns including phase identification was performed on Rigaku PDXL software, based on the collection of the reference powder diffraction files (PDF). For morphological investigation of reaction products using scanning electron microscopy (SEM), a drop of the ethanolic suspension of the powdered sample was placed on an aluminum stub, which was later coated with the 7-8 nm layer of gold using Denton Desk V sputter system, to enhance the electrical conductivity of the surface for minimizing samples charging artifacts.

Samples for scanning electron microscopy-energy dispersive spectroscopy (SEM-EDS) and backscattered electrons image (BSE) were prepared separately and the preparation excluded the aforesaid crushing step and gold-coating process. The top-most surface of the dried sample was progressively grinded using sandpapers with a finer grit size each time, then polished further using a diamond paste with 6 μm, 3 μm, and 1 μm on a lapping wheel.

SEM was performed using FEI Quanta 400 ESEM FEG with an accelerating beam voltage of 15 kV and the working distance of 10 mm employed for elemental analysis. Thermogravimetric analysis (TGA) coupled with differential thermogravimetric analysis (DTG) was carried out using a Q-600 Simultaneous TGA/DSC from TA instrument, where 4-7 mg of the sample was placed in an alumina tab and the temperature was raised from ambient temperature up to 1000° C. at the heating rate of 10° C./min under argon purged at the rate of 100 mL/min.

Application of the Taguchi Design

The Taguchi design of experiments, followed by ANOVA (Analysis of Variance) statistical analysis of the results is a proven methodology in optimizing the fly ash binder composition for the required mechanical strength and durability. (See, e.g., References 33-36). To ensure the high accuracy of analysis, the selection of appropriate variables and corresponding levels is extremely important and in our case, the selection was performed based on both of our own preliminary testing and the literature review.

For this research, we adopted the 4-variable+3-level Taguchi design (Table 2), which yields the 9th line or row (L9) array as elucidated in Table 3. As our system contains both calcium oxide and sodium-based chemicals, the first variable, the molar ratio of calcium to sodium ions present in the initial system (denoted as Ca/Na molar ratio) was selected to enable the systematic control of the relative ratio between the calcium- and sodium-based materials. For example, with the amount of FA-C fixed at 560 g for all of the 9 Taguchi experiments, increasing the Ca/Na molar ratio would increase the amount of calcium oxide, while it simultaneously decreases the amounts of sodium silicate pentahydrate and sodium hydroxide. To calculate the Ca/Na molar ratio, the moles of Ca ions and the moles of Na ions were first calculated based on the given amounts of CaO, $Na_2O$, NaOH present in the starting mixture, as provided by the XRF analysis of FA-C and the specification of $Na_2SiO_{3.5}H_2O$ provided from Alfa Aesar. The starting values for 3 levels of the parameters in Table 2 were selected based on literature review (or our preliminary investigation). For instance, the 3 levels of $NaOH/Na_2SiO_3$ molar ratio, 0.065, 0.265, and 0.465 were selected based on the literature review (see, e.g., References 26 and 37-19), and the 3 levels of the Ca/Na molar ratio, that is, 4.29, 5.79, and 7.29, were inspired by our preliminary investigation.

TABLE 2

Four variable - Three level Taguchi design

| Factors | 1 | 2 | 3 |
|---|---|---|---|
| Ca/Na molar ratio | 4.29 | 5.79 | 7.29 |
| $NaOh/Na_2SiO_2$ molar ratio | 0.065 | 0.265 | 0.465 |
| Amount of nanosilica (wt %) | 5 | 0 | 3 |
| Curing method (60° C.) | 12 h | 24 h (delay time) | 24 h |

TABLE 3

L9 ($3^4$) orthogonal array

| Experiment number | Factor A | Factor B | Factor C | Factor D |
|---|---|---|---|---|
| 1 | 1 | 1 | 1 | 1 |
| 2 | 1 | 2 | 2 | 2 |
| 3 | 1 | 3 | 3 | 3 |
| 4 | 2 | 1 | 2 | 3 |
| 5 | 2 | 2 | 3 | 1 |
| 6 | 2 | 3 | 1 | 2 |
| 7 | 3 | 1 | 3 | 2 |
| 8 | 3 | 2 | 1 | 3 |
| 9 | 3 | 3 | 2 | 1 |

Reactive nanosilica has already been verified to exert beneficial effects on fly ash-based geopolymer or typical portland cement products. (See, e.g., References 40-42). The 3 levels for the amount of nanosilica, 0 wt %, 3 wt %, and 5 wt % within each mixture proportion were selected based on previous publications where nanosilica was mostly applied in the amount less than 10 wt % of the entire solid mass. (See, e.g., Reference 43). Finally, the method of curing was selected as the fourth variable, since both curing temperature and curing time are known to significantly affect the compressive strengths of the fly ash binder. (See, e.g., References 44 and 45). In our case, the curing temperature was fixed at 60° C. and the 3 levels of the curing method differed by the duration only. The first level comprised curing at 60° C. for 12 hours before demolding and the second level consisted of leaving the molded specimen at room temperature for 24 hours, followed by demolding then curing at 60° C. for the subsequent 24 hours. There is a report that this delay time before application of heat induces the significant dissolution of silica and alumina from fly ash, leading to the formation of a continuous matrix phase, which in turn enhances the homogeneity of the resultant geopolymer. (See, e.g., References 46-48). The last level comprised curing at 24 hours before demolding. For all 3 levels of the curing method, curing at the specified duration at 60° C. was followed by room-temperature curing in a sealed plastic bag until the 7th day, when compressive testing was performed.

The primary challenge for designing the mixture proportions according to our Taguchi design stems from the interrelation of the variables via the chemical reagents. In other words, changing the value of the first variable, the Ca/Na molar ratio, inevitably results in an unwanted change in the amount of sodium hydroxide and that of sodium metasilicate pentahydrate, which in turn, affect the value of the second variable, the $NaOH/Na_2SiO_3$ molar ratio. This is problematic as the level of 1 variable must stay constant while the level of another changes. Furthermore, controlling the value of 1 variable can affect other external experimental factors within the mixture, such as $SiO_2/Na_2O$ and $Al_2O_3/SiO_2$ of the entire initial system, which can all influence the reaction pathway and thus, affect the final mechanical strengths. (See, e.g., References 49-52). Therefore, in order to control the level of the variable without affecting another variable, we wrote and applied a novel computational code using Fortran language, which yields the list of mixture proportions that satisfies given set of levels of the variables while it simultaneously keeps the total moles of OH, the ratio of the molar sum of the Ca and Na ions to the moles of $SiO_2$, and the ratio of moles of OH to the moles of $SiO_2$ of the whole system almost constant, within the error of 0.45. The basic outline of producing the mixture proportions based on the computational program is illustrated in FIG. 1B.

Overall, with the amount of FA-C being fixed, the relative proportions of the 5 constituent materials were varied within the following ranges throughout the 9 experiments: FA-C 76.4-80.3 wt %, Calcium oxide 12.9-17.1 wt %, Nanosilica 0-5 wt %, Sodium silicate pentahydrate (Solid content) 2.4-5.5 wt %, and sodium hydroxide 0.1-0.8 wt %. The final mixture proportions are illustrated in Table 4. The amount of water was varied depending on the amount of nanosilica added to achieve the similar flowability throughout the 9 experiments. Thus, the water/(fly ash+calcium oxide+nanosilica) ratio was kept to 53%, 64%, and 71% for 0 wt %, 3 wt %, and 5 wt % of nanosilica, respectively.

TABLE 4

Mixture proportions used for the Taguchi design

| Experiment number | (Ca/Na) molar ratio | FA—C (g) | CaO (g) | Nanosilica (g) | Sodium silicate pentahydrate (g) | Sodium hydroxide (g) |
| --- | --- | --- | --- | --- | --- | --- |
| 1 | 4.29 | 560.0 | 94.6 | 36.7 | 69.8 | 0.9 |
| 2 | 4.29 | 560.0 | 98.5 | 0.0 | 62.4 | 3.5 |
| 3 | 4.29 | 560.0 | 104.4 | 19.0 | 60.7 | 5.7 |
| 4 | 5.79 | 560.0 | 108.8 | 0.0 | 48.4 | 0.9 |
| 5 | 5.79 | 560.0 | 118.0 | 20.0 | 47.0 | 2.3 |
| 6 | 5.79 | 560.0 | 114.9 | 33.8 | 43.4 | 3.9 |
| 7 | 7.29 | 560.0 | 121.2 | 20.0 | 36.1 | 0.5 |
| 8 | 7.29 | 560.0 | 125.6 | 39.8 | 33.5 | 1.7 |
| 9 | 7.29 | 560.0 | 119.3 | 0.0 | 29.4 | 2.8 |

Number 6 above shows the preferred design in this embodiment.

Results and Discussion

Strength Evaluation and Statistical Analysis

In this section, we present 7-day compressive strengths of the 9 samples from the Taguchi design. Percentage contributions from the 4 variables and contributions from the individual levels within each variable calculated using ANOVA method are also presented. Finally, we present the results from extensive material characterization based on XRD, FT-IR, TGA-DTG, and SEM-EDS and successfully correlate the contributions from the variables and the levels with their effects on formation of the key reaction products.

Figure 2:
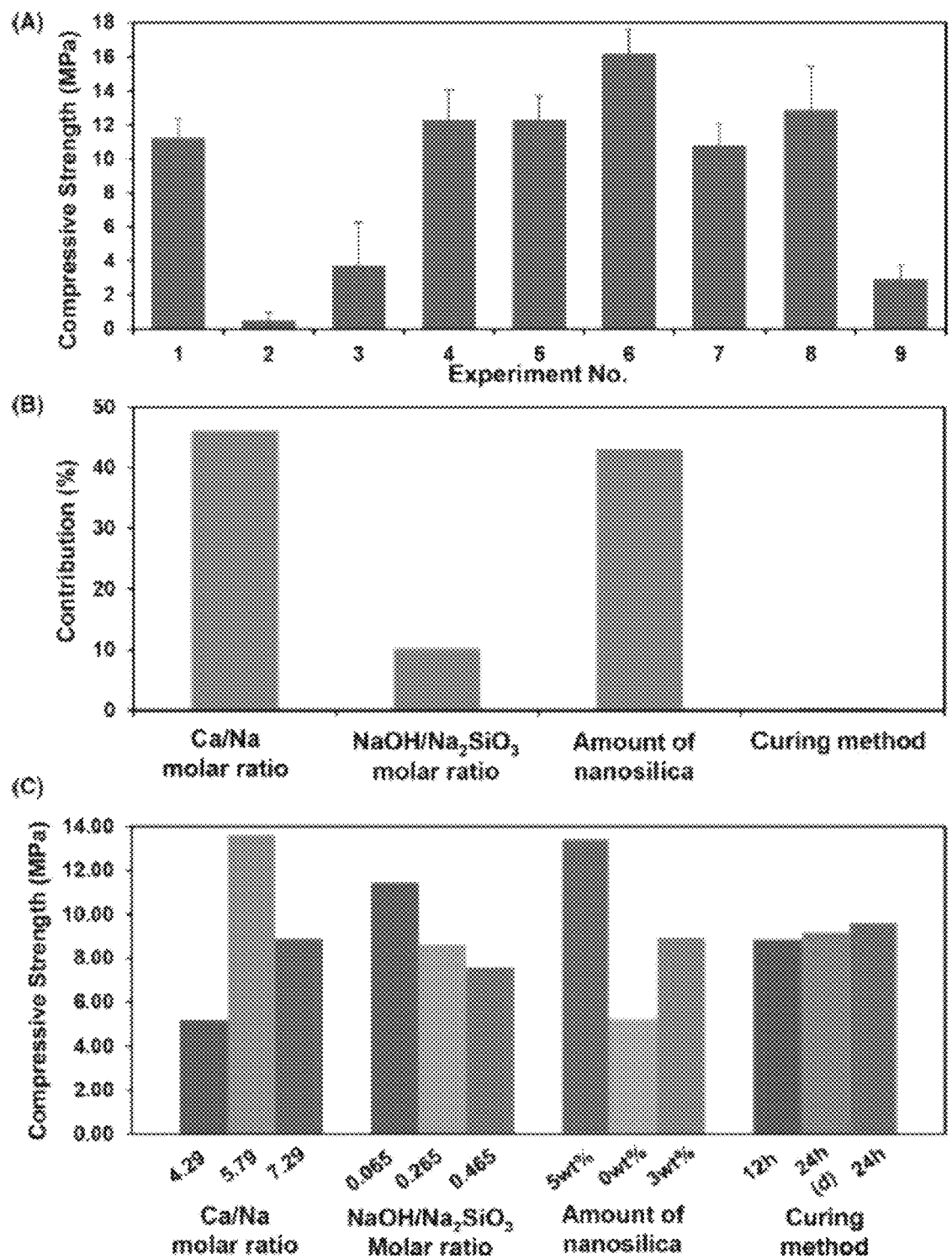
FIG. 2A is average 7-d compressive strengths for 9 experiments performed according to the Taguchi design.
FIG. 2B is main percentage contribution from each variable on the 7-d compressive strength calculated according to ANOVA analysis.
FIG. 2C is the effect of individual level of the 4 set variables.

FIG. 2A illustrates the 7-day compressive strength of the 9 fly ash binder pastes. The paste from the experiment 6 created using 5 wt % nanosilica with the Ca/Na molar ratio=5.79 reaches the highest value of 16.18 MPa while the paste from the experiment 2 created with 0 wt % nanosilica with the Ca/Na molar ratio=4.29 shows the minimal strength of 0.54 MPa. FIG. 2B illustrates the contribution of the 4 factors on the 7-day compressive strength, calculated in percentages using ANOVA method. (See, e.g., Reference 53). The figure confirms that the Ca/Na molar ratio and the amount of nanosilica in the starting mixture exert the largest (and almost identical) contributions of 46.15% and 43.07%, respectively, while the molar ratio of $NaOH/Na_2SiO_3$ and the curing method exert the moderate contribution of 10.37% and the statistically insignificant contribution of 0.41%, respectively. Table S1 summarizes the ANOVA output, illustrating the values of the important components, which encompass the sums of squares, percentage contributions, mean squares, and F-ratios of the 4 independent variables. (See, e.g., Reference 54). Comparison of the latter with the critical F-value at $\alpha=0.05$ confirmed that the Ca/Na molar ratio, the $NaOH/Na_2SiO_3$ molar ratio and the amount of nanosilica all exert statistically significant effects on the early-age strength at 95% confidence interval. As verified by the notably high percentage contributions of 46.15% and 43.07%, respectively, the Ca/Na molar ratio and the amount of nanosilica are the two most influential variables.

Figure 8:
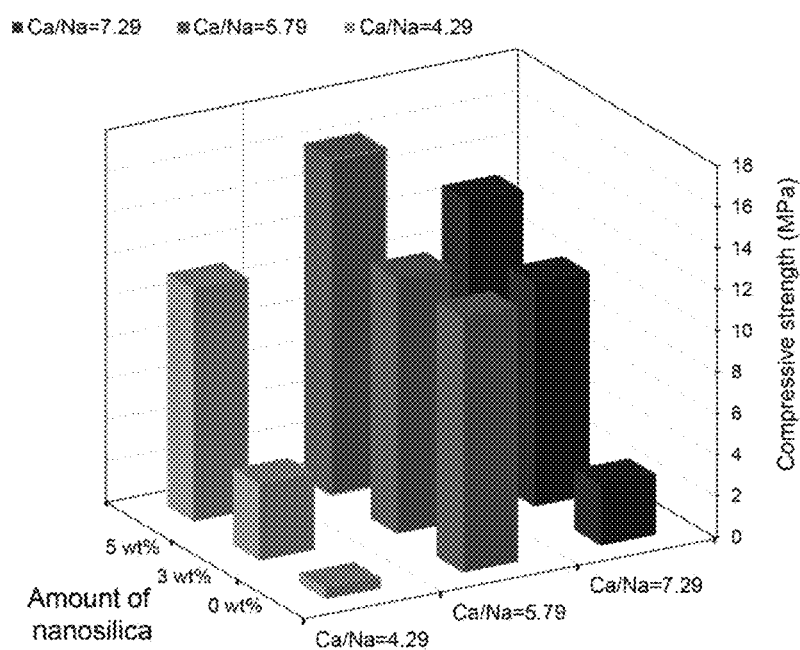
FIG. 8 is a 3D-Plot illustrating the effects of the two most influential variables, the amount of nanosilica and the Ca/Na molar ratio on the early-age compressive strengths. Each column represents the mean compressive strength calculated at a specific combination of those two variables. The column with the red edges represents the optimum point (Amount of nanosilica=5 wt % and Ca/Na=5.79).

FIG. 2C illustrate the contribution of individual level within each factor on the compressive strength. For the Ca/Na molar ratio, 5.79 exerted the largest contribution to the strength, implying that the intermediate ratio of calcium oxide to the sodium-based activators induces the highest compressive strength. Compressive strength was favored by the addition of nanosilica, with 5 wt % achieving the highest average compressive strength for all 3 Ca/Na molar ratios (FIG. 8). For the Ca/Na molar ratio of 4.29, the addition of 3 wt % and 5 wt % of nanosilica induced 589% and 1995% higher average compressive strength compared to the sample with 0 wt % of nanosilica, respectively. Similarly, for the Ca/Na molar ratio of 7.29, the addition of 3 wt % and 5 wt % of nanosilica induced 268% and 338% higher strength than the sample with 0 wt % of nanosilica, respectively. The samples within the Ca/Na molar ratio of 5.79, the group with the highest average strength, showed negligible difference in strength between 0 wt % and 3 wt % of nanosilica but 5 wt % of nanosilica induced 31% increase in strength compared to 0 wt % of nanosilica. Overall, the results confirm that the addition of nanosilica plays a critical role in strength development of our new binder system.

For the $NaOH/Na_2SiO_3$ molar ratio, the strength development was facilitated by the lowest level, 0.065. In case of the curing method, the compressive strength differs within only 1 MPa between 3 levels, implying insignificant contribution. More dramatic changes in the curing method, such as variations in curing temperature from 60° C. to 90° C. or the time duration between the levels differing by several days, may induce more significant contribution from this factor. Overall, the 7-day compressive strength ranges between 10.83 and 16.18 MPa for six out of the 9 samples, while the 2 samples from the Ca/Na molar ratio of 4.29 and 1 sample from the Ca/Na molar ratio of 7.29 achieved extremely low strengths below 5 MPa.

Identification and Quantification of the Key Reaction Products

Figure 3:
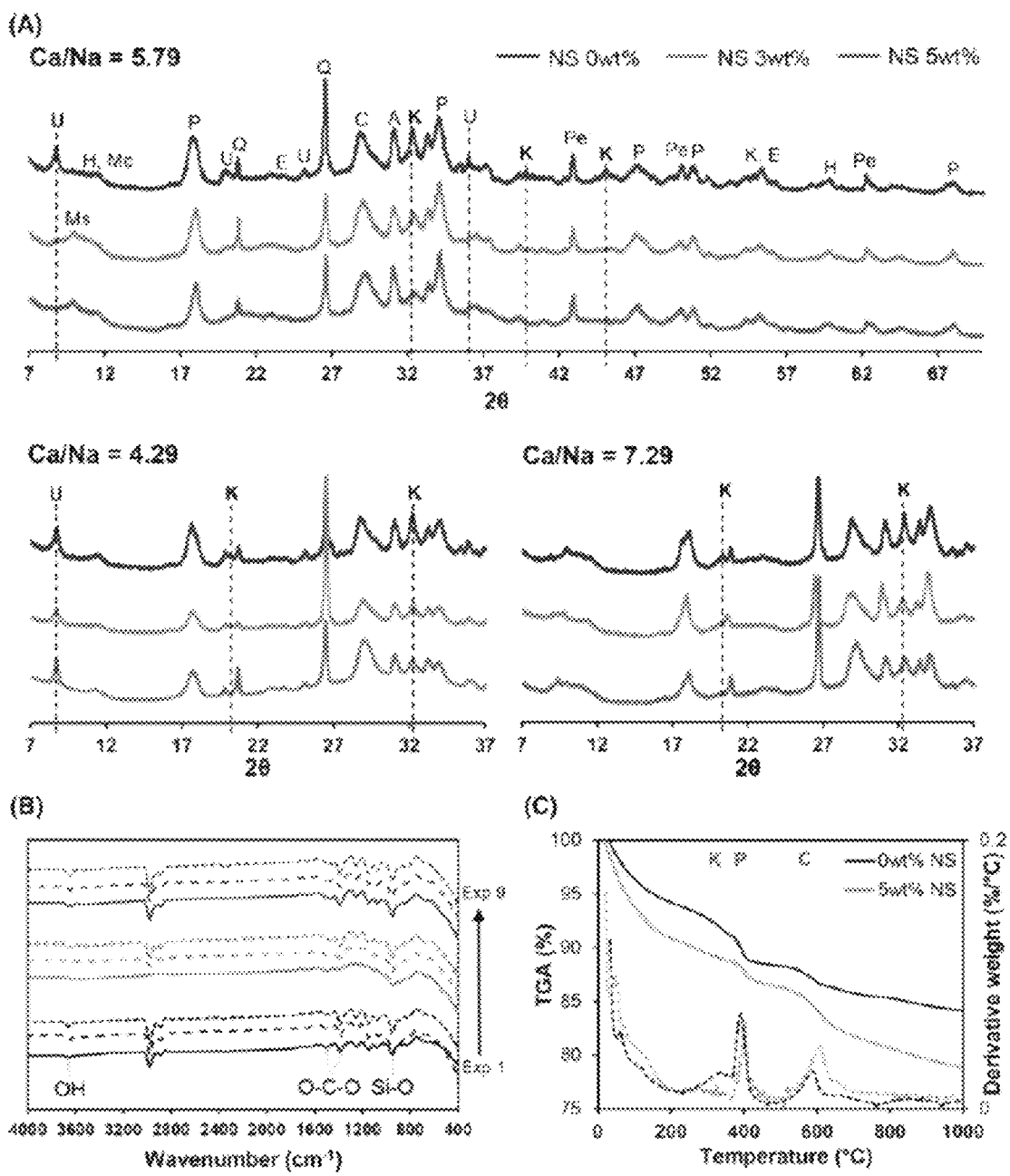
FIG. 3A is X-ray diffraction patterns grouped to the individual level of Ca/Na molar ratio. Notations represent Q, Quartz, A, Anhydrite, H, Hydrotalcite, Pe, Periclase, L, Lime, K, Katoite P, Portlandite, C, Calcite, E, Ettringites, U, U-phase, Ms, Monosulfate, Mc, Monocarbonate. Black dotted lines indicate the peak positions for U-phase and katoite.
FIG. 3B is FT-IR spectra of the 9 samples. Black lines are the spectra for sample 1, 2, 3 within the Ca/Na molar ratio of 4.29, red lines for sample 4, 5, 6 within the Ca/Na molar ratio of 5.79 and blue lines for sample 7, 8, 9 within the Ca/Na molar ratio of 7.29.
FIG. 3C is TGA (Normal lines) and DTG (Dotted lines) patterns for sample from exp 1 (5 wt % nanosilica), and exp 2 (0 wt % nanosilica). Colored boxes labeled as K, P, and C indicate temperature ranges for the decomposition of katoite, portlandite, and calcite, respectively.

In order to ascertain the reason why the Ca/Na molar ratio and the amount of nanosilica were the most influential factors on the 7-day compressive strength, the combination of XRD, SEM-EDS, FT-IR, and TGA/DTG was adopted to identify and compare the reaction products between the samples. Table S2 summarizes the characterization techniques performed on our samples throughout the research. The XRD analysis was first performed on the 3 samples containing different amounts of nanosilica within the Ca/Na molar ratio of 5.79, the group with the highest average compressive strength (FIG. 3A). In general, the samples exhibit similar diffraction profiles, implying the formation of common reaction products including portlandite, calcite, hydrotalcite, and calcium aluminate monocarbonate. A broad peak at 28-30° is likely to indicate the presence of poorly crystalline calcium silicate hydrate (C—S—H). Despite the similar phase assemblage exhibited by the 3 samples, the addition of nanosilica diminishes the intensity of peaks at specific 2θ angles including 9°, 20°, 25°, and 36°. The aforesaid diffraction profiles arise from the presence of the sodium-substituted AFm phase, also renowned as the U-phase (PDF No:00-044-0272). The formation of the U-phase is known to prevail when there is an excessive amount of sodium ions coupled with high concentrations of alumina species and its formation is known to induce deleterious expansion in cement-based materials. (See, e.g., Reference 55 and 56). The inhibitory effect of nanosilica on the formation of the U-phase within the Ca/Na molar ratio of 5.79 may be elucidated using its possible effect on the total sodium content. Nanosilica has been widely proven to facilitate the formation of C—S—H. (See, e.g., References 57 and 58). The large availability of aluminum and sodium ions in our system is likely to induce the incorporation of both ions within the silicate network of the C—S—H gel, leading to the formation of C—(N)-A-S—H. This alkali substitution will ultimately decrease the total sodium content in pore solutions available for the formation of the U-phase. This is further verified by the Ca/Na molar ratio of 4.29, which is governed by the excessive amount of sodium ions, exhibiting the U-phase in all 3 samples. Within this ratio, the formation of the U-phase is unaffected by the addition of nanosilica. On the other hand, the U-phase is completely absent within the molar ratio of 7.29, which is governed by the high calcium content.

According to the XRD analysis, nanosilica also suppresses the formation of katoite (PDF No: 04-017-4319) with a chemical formula of $Ca_3Al_2(OH)_{12}$ as verified by the diminished peaks at 32°, 40°, and 45°. While nanosilica suppresses the formation of the U-phase only within the Ca/Na molar ratio of 5.79, it decreases the formation of katoite for all 3 Ca/Na molar ratios. Katoite, often abbreviated as $C_3AH_6$, is a common phase observed during the hydration of calcium aluminate cement or warm cured port-land cement. It is a thermodynamically stable product, transformed from metastable $CAH_{10}$ and $C_2AH_8$ and its formation is known to cause the increase in porosity, which in turn induces the loss of strength. (See, e.g., Reference 59). The effect of nanosilica in suppressing the formation of $C_3AH_6$ has already been observed from the hydration of calcium aluminate cement, which produces $C_3AH_6$ and $Al(OH)_3$ as the final products. (See, e.g., Reference 60). Addition of silica fume prevents the deleterious transformation of the metastable phase into $C_3AH_6$ by inducing the formation of aluminosilicates such as gehlenite. (See, e.g., Reference 61). Overall, the XRD analysis herein reveals that the formation of the U-phase is highly dependent on the Ca/Na molar ratio and for the Ca/Na molar ratio of 5.79, it can be inhibited by the addition of nanosilica. Furthermore, nanosilica suppresses the formation of katoite for all 3 Ca/Na molar ratios.

Infrared spectra (FT-IR) serve as a useful supplementary data to the XRD analysis above (FIG. 3B). The Si—O-T (T=Si or Al) stretching band at 947 $cm^{-1}$ combined with the shoulders at 890 $cm^{-1}$ and 1060 $cm^{-1}$ confirm the presence of C—S—H. (See, e.g., Reference 62). Given the significant availability of aluminum ions that lead to the formation of katoite and also, the lower wave number assigned the Si—O-T stretching band compared with the previously reported values for pure C—S—H, it can be deduced that an aluminum substitution has occurred within the structure of the C—S—H gel. (See, e.g., References 62 and 63). The OH-stretching band at 3640 $cm^{-1}$ indicates the presence of portlandite. (See, e.g., References 62, 64 and 65). The asymmetric stretching vibration of Al—O/Si—O is seen at 1380 $cm^{-1}$ and the weak stretching and bending vibrations of the Al—O bonds in the octahedral $Al—O_6$ groups of $Ca_3Al_2(OH)_{12}$ appear at around 505 $cm^{-1}$ and 820 $cm^{-1}$, respectively. (See, e.g., Reference 66). The formation of calcite induced the bands at 1380-1490 $cm^{-1}$, arising from the asymmetric stretching of $CO_3^{2-}$ and also, the weak shoulder at 875 $cm^{-1}$ due to the out-of-plane bending of $CO_3^{2-}$. The bending vibration and the stretching vibration of molecular $H_2O$ appear at 1640 $cm^{-1}$ and at 3200-3600 $cm^{-1}$, respectively. (See, e.g., Reference 14). Overall, the FT-IR spectra further support the formation of major reaction products revealed by the XRD patterns.

Having confirmed the effect of the Ca/Na molar ratio and the amount of nanosilica on the formation of key reaction phases including the U-phase and katoite, TGA/DTG, SEM, and SEM-EDS techniques were employed to further verify this influence. For those 3 specific techniques, the samples with 0 wt % and 5 wt % of nanosilica were selected for analysis and the samples with 3 wt % of nanosilica were excluded for simplicity. This is because we have already confirmed that 3 wt % of nanosilica exerts similar positive effects on compressive strengths as 5 wt % nanosilica and also, similar effects on the formation of key reaction phases, katoite, and the U-phase.

The TGA/DTG patterns of the samples containing 0 wt % and 5 wt % nanosilica within the Ca/Na molar ratio of 4.29 are illustrated in FIG. 3C as the representative data. This representation is validated since the samples within the other 2 Ca/Na molar ratios all generated identical patterns with the inflection points arising at similar temperatures. The assemblage of multiple phases and their overlapping decomposition ranges render it extremely challenging to quantify them based on the TGA analysis alone. Nevertheless, the quantification of certain reaction phases such as katoite, portlandite, and calcite was possible, as verified by the existence of strong, non-overlapping peaks in the DTG curve (FIG. 3C). The decomposition temperatures for katoite (280-365° C.), portlandite (365-420° C.), and calcite (530-640° C.) were selected based on the combination of the DTG curves acquired herein and the literature review. (See, e.g., References 27 and 67). The aforesaid ranges were slightly altered for the other samples in compliance with their specific DTG curves. The amount of each phase was calculated as a percentage of the total mass loss that occurred during the TGA analysis and illustrated in Table 5. The presence of calcite indicates that a certain extent of carbonation had occurred during the testing or post-analysis despite the numerous efforts to avoid it, for example, curing the samples in sealed plastic bags and performing materials characterization immediately after drying from the solvent exchange process. It is possible that calcium oxide prepared via the calcination of calcium hydroxide had undergone a certain degree of carbonation prior to the mixing process. In order to further minimize the unnecessary carbonation occurring within our system in future, the storage of calcium oxide inside a glovebox or a desiccator can be investigated.

TABLE 5

Summary of the thermal analysis (TGA/DTG)

| Ca/Na molar ratio | Amount of Nanosilica (%) | Total Mass loss (%) | Amount of reaction product (% of the total mass loss) | | |
|---|---|---|---|---|---|
| | | | Katoite | Portlandite | Calcite |
| 4.29 | 0 | 15.86 | 12.5 | 14.9 | 11.3 |
| | 5 | 21.15 | 4.8 | 7.5 | 15.1 |
| 5.79 | 0 | 19.83 | 7.1 | 7.5 | 10.7 |
| | 5 | 20.64 | 3.7 | 5.0 | 11.3 |
| 7.29 | 0 | 15.86 | 13.3 | 17.3 | 15.7 |
| | 5 | 19.26 | 6.7 | 10.2 | 13.0 |

First of all, Table 5 confirms that the total mass loss for the sample synthesized with 5 wt % nanosilica is 33.4%, 4.1%, and 21.4% higher than the sample synthesized with 0 wt % nanosilica within the Ca/Na molar ratio of 4.29, 5.79, and 7.29, respectively. This indicates that nanosilica serves to enhance the overall degree of reaction for fly ash for all 3 Ca/Na molar ratios, thereby decreasing the proportion of unreacted or partially reacted fly ash particles. This will facilitate the formation of more compact microstructure, which is in turn favorable to the overall strength. The intermediate Ca/Na molar ratio of 5.79 exhibits the smallest difference in total mass loss between the 2 samples containing 0 wt % and 5 wt % nanosilica. This correlates with the strength testing where all 3 samples within the Ca/Na molar ratio of 5.79 achieved relatively high strengths over 10 MPa. For the Ca/Na molar ratio of 4.29 and 7.29, the amount of katoite decreased by 61.3% and 49.4%, respectively, due to the addition of 5 wt % nanosilica, further supporting the inhibitory effect of nanosilica on the formation of katoite. Also, the addition of 5 wt % nanosilica leads to a 49.5% and 41.3% decrease in the amount of portlandite for the Ca/Na molar ratio of 4.29 and 7.29, respectively, indirectly implying that nanosilica has enhanced the pozzolanic activity by reacting with portlandite. As with the total mass loss described above, the effect of nanosilica on the formation of katoite and portlandite was less pronounced for the intermediate ratio of 5.79. Also, the total amounts of portlandite and katoite were higher for the Ca/Na molar ratio of 7.29 compared to the other 2 ratios due to the high Ca content.

Morphological and Compositional Analysis of the Reaction Products

Figure 4:
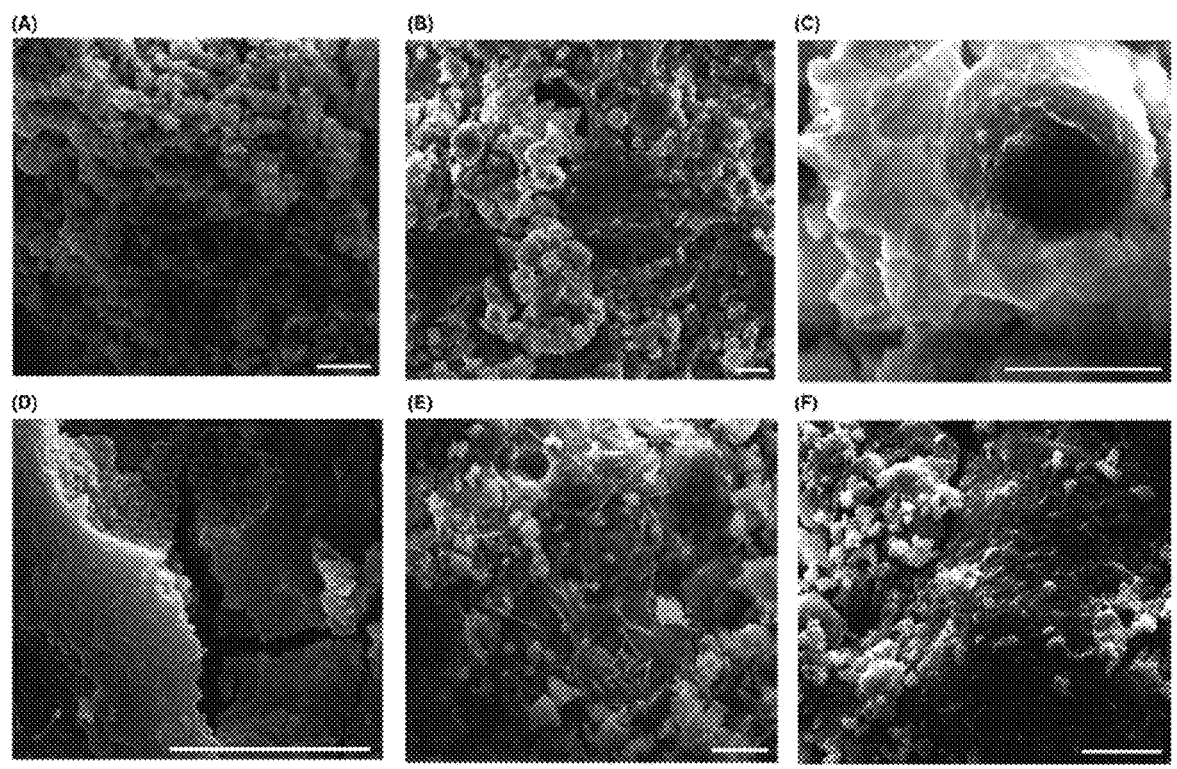
FIG. 4 is an SEM image of the weakest sample within the Ca/Na molar ratio of A, 4.29, B, 5.79, and C, 7.29 and the strongest sample within the Ca/Na molar ratio of D, 4.29, E, 5.79, and F, 7.29. Scale bar indicate 5 μm.

SEM analysis was subsequently performed to investigate morphological features of some of the aforesaid reaction products. FIG. 4A-C are the microscopic images of the samples from exp 2, exp 4, and exp 9, each of which contained 0 wt % nanosilica and showed the lowest compressive strength within the Ca/Na molar ratio of 4.29, 5.79, and 7.29, respectively. FIG. 4D-F represent the strongest samples (5 wt % nanosilica) from each Ca/Na molar ratio. In general, the weaker samples, particularly those within the Ca/Na molar ratio of 4.29 and 7.29 comprise mainly of individual, discrete reaction products and a large proportion of unreacted fly ash particles in compliance with the TGA analysis. On the other hand, the stronger samples synthesized with 5 wt % contain a greater proportion of continuous, space-filling regions, which are favorable to the overall strengths. Nevertheless, they still exhibit the heterogeneous distribution of multiple crystalline products with the unique morphology such as ettringite needles, as identified from the XRD analysis (FIG. 4E).

In order to further analyze the microstructure and the elemental composition of a space-filling, cementitious gel, SEM-EDS was performed on flat-cross sections of the samples synthesized with 0 wt % and 5 wt % within each Ca/Na molar ratio. The samples for SEM-EDS were separately prepared following the modified standard procedure for microscopic imaging. (See, e.g., Reference 68). It should first be noted that SEM-EDS cannot accurately determine the chemical composition of each individual phase for cementitious materials, since multiple phases are often intermixed within the interaction volume of the SEM-EDS. (See, e.g., Reference 69). However, it can still provide useful information on the distribution of key elements on the microscopic scale.

Figure 5:
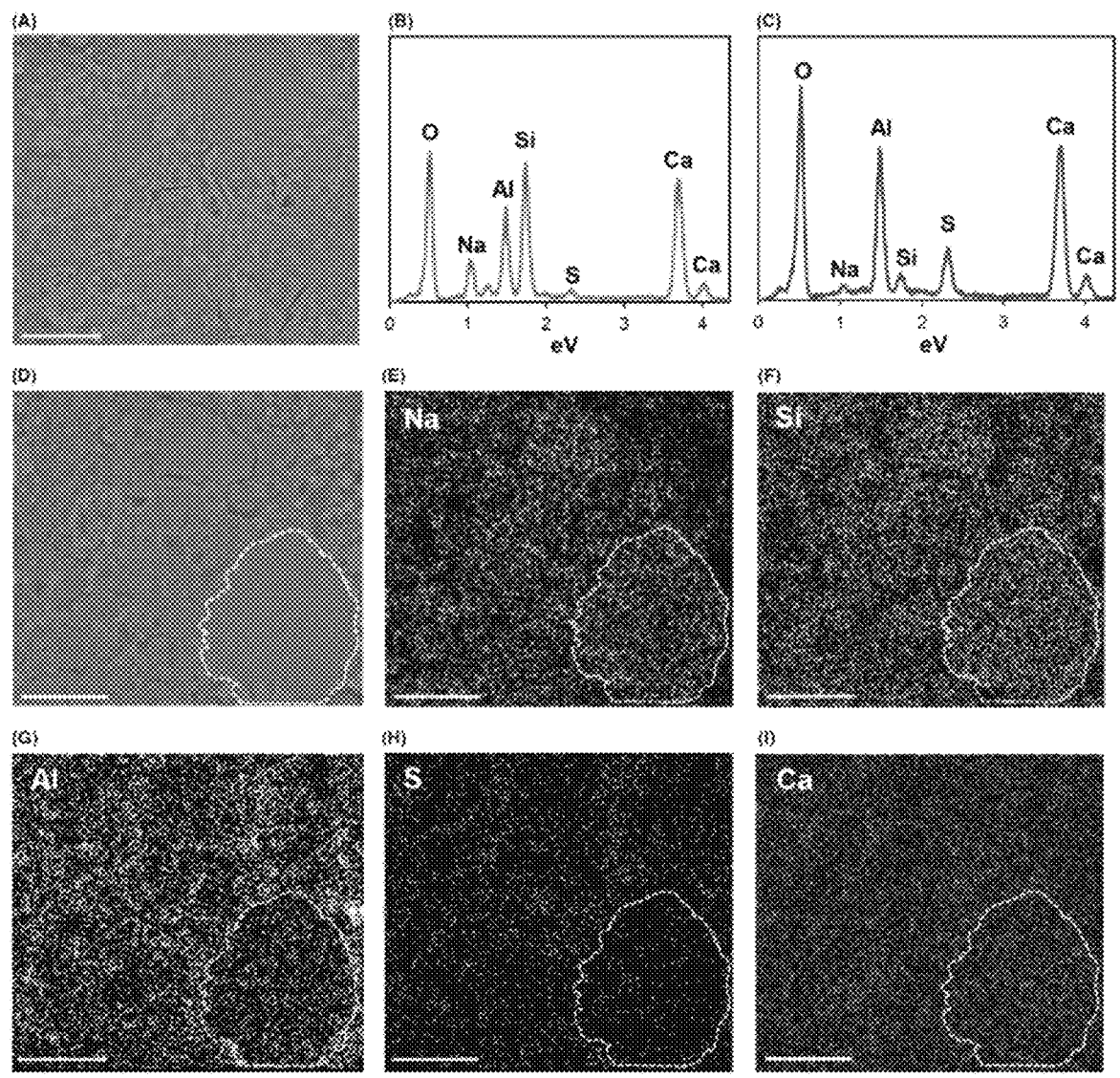
FIG. 5A is a BSE image for sample 1 (5 wt % nanosilica) within the Ca/Na molar ratio of 4.29.
FIGS. 5B-C are EDS spectra obtained from point analysis on B, red dot and C, blue dot clearly showing the difference in intensities for Al, Si, and S.
FIG. 5D is BSE image for sample 2 (0 wt % nanosilica).
FIGS. 5E-I are elemental mapping for 5 distinct elements. Scale bar indicates 25 μm.

BSE image for sample from exp 1, the strongest sample within the Ca/Na molar ratio of 4.29 illustrates the region governed by the intermixing of light grey and dark grey regions over the scale of hundreds of microns (FIG. 5A). Point analysis on a dark grey region, as indicated with the red dot, signals the significant presence of calcium, aluminum, silicon ions and also, sodium ions (FIG. 5B). This implies that the darker region is likely to be sodium-substituted C-A-S—H gel, also known as C—(N)-A-S—H gel. Point analysis on a brighter region (blue dot) exhibits the notably enhanced sulfur and aluminum content while it shows the diminished peaks for silicon (FIG. 5C). This coupled with the black band structures on the BSE image indicates that the brighter region is mainly comprised of ettringites. The backscattered electrons image of sample from exp 2, the weakest sample within Ca/Na molar ratio of 4.29 exhibits a similar type of intermixing. Elemental mapping confirms the presence of sodium, silicon, calcium, and aluminum ions on a continuous region (white dotted line), again indicating the sign of aluminum and sodium substitution within the C—S—H (FIG. 5E-I). The formation of C—(N)-A-S—H gel and the exact role of sodium ions within the C—S—H network, for example, as charge balancing ions, could be confirmed using the solid-state NMR but it is currently outside the scope of this work.

In order to further probe the effect of the Ca/Na molar ratio and the amount of nanosilica on the elemental composition of the C—S—H gel, SEM-EDS analysis was performed on samples synthesized with 0 wt % nanosilica and 5 wt % nanosilica for all 3 Ca/Na molar ratios. Ternary phase diagrams (CaO—$SiO_2$—$Al_2O_3$) acquired from SEM-EDS can provide useful implications on the degree of sodium and aluminum substitution in a cementitious C—S—H gel and also, on the degree of intermixing with other secondary phases. (See, e.g., References 70-72). Point analysis was performed on at least 30 different locations on a continuous region with the dimension in a single direction over at least 10 Each point analysis was performed at a spot free of unreacted fly ash particles or other discrete reaction products. The quantities of calcium, silicon, and oxygen were normalized to 100% on an oxide basis, assuming that all other elements are absent.

Figure 6:
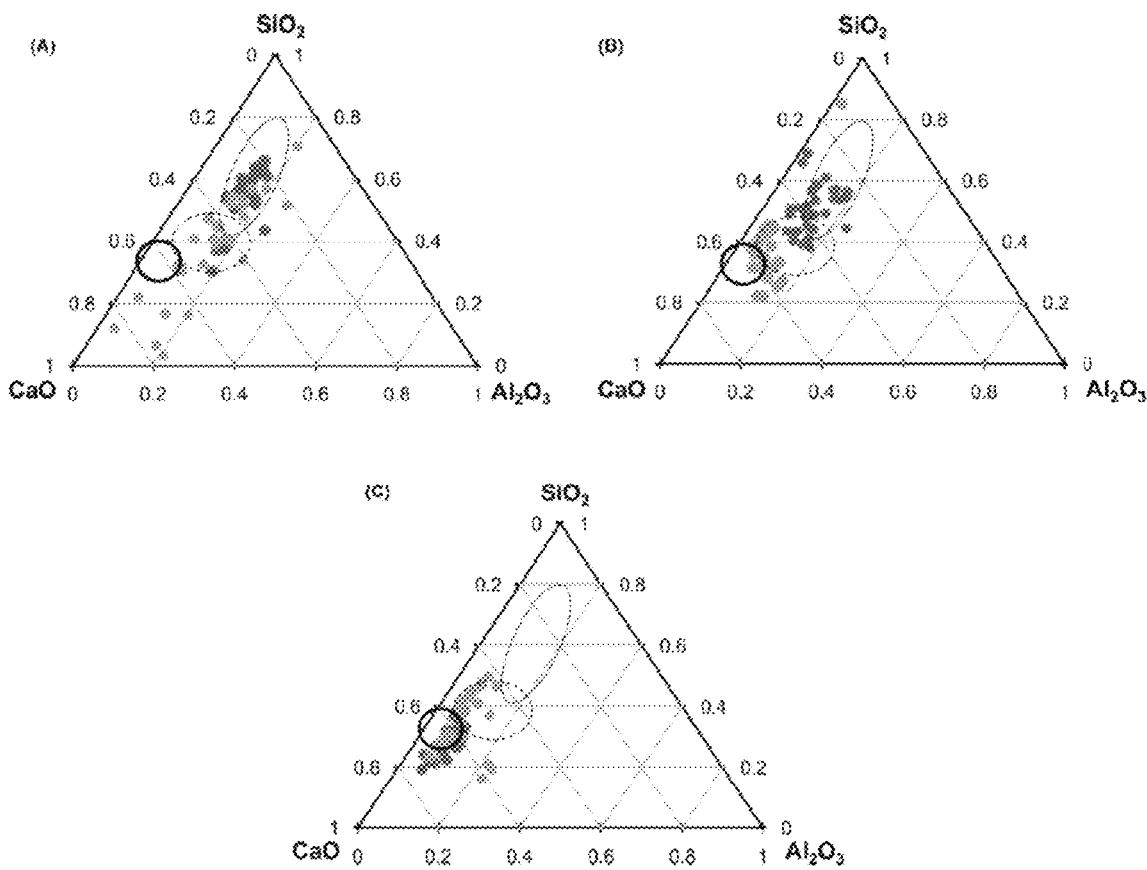
FIG. 6A is a ternary $CaO-SiO_2-Al_2O_3$ phase diagrams obtained for the samples synthesized with 0 wt % nanosilica and 5 wt % nanosilica for the Ca/Na molar ratio of 4.29. Thin and thick black circle indicates the C—(N)-A-S—H and C—S—H region, respectively. Dotted black circle indicates the C-A-S—H region. NS indicates nanosilica.
FIG. 6B is a ternary $CaO-SiO_2-Al_2O_3$ phase diagrams obtained for the samples synthesized with 0 wt % nanosilica and 5 wt % nanosilica for the Ca/Na molar ratio of 5.79. Thin and thick black circle indicates the C—(N)-A-S—H and C—S—H region, respectively. Dotted black circle indicates the C-A-S—H region. NS indicates nanosilica.
FIG. 6C is a ternary $CaO-SiO_2-Al_2O_3$ phase diagrams obtained for the samples synthesized with 0 wt % nanosilica and 5 wt % nanosilica for the Ca/Na molar ratio of 7.29. Thin and thick black circle indicates the C—(N)-A-S—H and C—S—H region, respectively. Dotted black circle indicates the C-A-S—H region. NS indicates nanosilica.

SEM-EDS analysis on a cementitious gel usually induces signals from other phases such as portlandite and ettringite due to intermixing within the microvolume of analysis. (See, e.g., Reference 72). Overall, the phase diagrams acquired herein indicate that considerable amounts of aluminum and sodium ions exist within the structure of cementitious gel for all 3 Ca/Na molar ratios (FIG. 6A-C). Within the Ca/Na molar ratio of 4.29, governed by the excessive amount of sodium ions, the addition of nanosilica reduces the dispersion of data points, which become centered in the typical region of C—(N)-A-S—H (FIG. 6A).

The data points within the Ca/Na molar ratio of 5.79, exhibit much less degree of scatter for both samples with 0 wt and 5 wt % of nanosilica compared with the other 2 ratios (FIG. 6B). Herein, the addition of nanosilica decreases the Ca/Si ratio of the cementitious gel and move the data points towards the region of C—(N)-A-S—H gel from C—S—H/C-A-S—H gel. This correlates with the hypothesis from the XRD analysis, that nanosilica suppresses the formation of the U-phase by facilitating the formation of C—(N)-A-S—H, which decreases the total sodium content available. For the final Ca/Na molar ratio of 7.29, the data points move to the region with the higher CaO content. This could be due to the intermixing with the increased amounts of portlandite and katoite crystals as revealed by the TGA-DTG analysis.

Overall in this report, the novel composition design, which mainly consists of high calcium fly ash and calcium oxide can produce the paste with the moderate to high strength when it is applied with small amounts of sodium hydroxide, sodium metasilicate pentahydrate, and nanosilica. Calcium oxide used in our design is generated from the combustion of calcium hydroxide and in general, calcium oxide can also be produced from the combustion of limestone via decarbonation, which in turn causes $CO_2$ emissions. However, even when the latter is the case, the amount of calcium oxide in our composite system is 12.9-17.1 wt %. This range indicates the significantly decreased source of carbon dioxide compared with the binder system comprising 100% cement. If the strength value of 16.18 MPa acquired herein is compared with the values of geopolymer pastes from the previous studies, reaching over 20 to 30 MPa, it seems moderate. However, it should be noted that the majority of the previous publications either adopt fly ash as the supplementary material (SSM), replacing a certain portion of portland cement or rely on the high dosage of sodium hydroxide solution or/and waterglass solution, whose concentration ranges from 8M up to 16M. Thus, the main novelty of our work lies in devising an optimum formula for a cost-effective self-cementing fly ash with the strength values compared to mixture of portland cement and SSMs while having far less $CO_2$ footprint. In this context, our work opens up an entirely new opportunity to fabricate a low-cost, environmentally friendly binder using wastes such as fly ash and the other materials above without applying high concentrations of sodium-based activators.

Additional Supplemental Data

Tables S1 and S2 below show additional data.

TABLE S1

ANOVA (Analysis of variance) results for the early-age compressive strength of the composite system.

| Factor | Degree of freedom (DF) | Sum of squares (SS) | % Contribution | Mean squares (MS) | F-ratio |
|---|---|---|---|---|---|
| Ca/Na molar ratio | 2 | 322.76 | 46.15 | 161.38 | 40.45 |
| $NaOH/Na_2SiO_3$ molar ratio | 2 | 72.55 | 10.37 | 36.28 | 9.1 |
| Amount of nanosilica | 2 | 301.2 | 43.07 | 150.6 | 37.74 |
| Curing method | 2 | 2.85 | 0.41 | 1.42 | 0.36 |
| Error | 18 | 71.74 | — | 3.99 | — |
| Total | 26 | 771.10 | — | 353.67 | — |

Critical F-value at α = 0.05 (Confidence interval = 95%)

Degree of freedom (DF) = L-1  (1)

$$\text{Sum of squares } (SS) = NS \times L \times \sum_{i=1}^{L} (X_i - X_m)^2 \quad (2)$$

% Contribution = SS/TSS  (3)
Mean squares (MS) = SS/DF  (4)
F-ratio = MS/MSE  (5)

*NS (Number of samples synthesized for each experiment), L (Number of levels), $X_i$ (Mean compressive strength at level i), $X_m$ (Mean compressive strength of all samples), TSS (Total sum of squares), MSE (Mean square error).

TABLE S2

Summary of the characterization techniques performed throughout the research.

| Experiment Number (Ca/Na molar ratio, amount of nanosilica) | Powder XRD (FIG. 3a) | FT-IR (FIG. 3b) | TGA-DTG (FIG. 3c, Table 5) | SEM (FIG. 4) | BSE/EDS (FIG. 5a-c) | BSE/EDS Mapping (FIG. 5d-i) | SEM/EDS (FIG. 6) |
|---|---|---|---|---|---|---|---|
| 1 (4.29, 5 wt %) | ○ | ○ | ○ | ○ | ○ | | ○ |
| 2 (4.29, 0 wt %) | ○ | ○ | ○ | ○ | | ○ | ○ |
| 3 (4.29, 3 wt %) | ○ | ○ | | | | | |
| 4 (5.79, 0 wt %) | ○ | ○ | ○ | ○ | | | ○ |
| 5 (5.79, 3 wt %) | ○ | ○ | | | | | |
| 6 (5.79, 5 wt %) | ○ | ○ | ○ | ○ | | | ○ |
| 7 (7.29, 3 wt %) | ○ | ○ | | | | | |
| 8 (7.29, 5 wt %) | ○ | ○ | ○ | ○ | | | ○ |
| 9 (7.29, 0 wt %) | ○ | ○ | ○ | ○ | | | ○ |

Summary of Conclusions

The wide starting blend system, which consists of high calcium fly ash (76.4-80.3 wt %) and calcium oxide (12.9-17.1 wt %) co-applied with the small amount of sodium metasilicate pentahydrate (2.4-5.5 wt %), sodium hydroxide (0.1-0.8 wt %), and nanosilica (0-5 wt %) were intelligently narrowed down via the Taguchi method to produce a composition with sufficient binder properties, as verified by compressive strength of 16.18 MPa. This was possible via developing a novel computational code to generate mixture proportions for the specific set of Taguchi levels accounting for chemically interrelated species.

The statistical analysis proved that 5.79 for the starting Ca/Na molar ratio, 5 wt % for the amount of nanosilica and 0.065 for the $NaOH/Na_2SiO_3$ ratio are the optimum levels, which together induce the highest compressive strength. Two of the variables, the Ca/Na molar ratio and the amount of nanosilica were found to exert a profound influence on the strength, with the percentage contributions of ~46% and 43%, respectively. The microstructural analysis reveals that the overall reaction pathway of our binder resembles the hydration process of calcium aluminate cement, with the similar assemblage of phases including katoite as one of the major reaction products.

The rigorous materials characterization confirmed that the Ca/Na molar ratio and the amount of nanosilica exert significant influences on the ensemble of the reaction products. At the Ca/Na molar ratio of 4.29, the deleterious formation of U-phase prevails while it is absent at the Ca/Na molar ratio of 7.29. At the intermediate ratio of 5.79, nanosilica inhibits the formation of the U-phase. For all 3 Ca/Na molar ratios (4.29, 5.79, and 7.29), nanosilica decreases the formation of katoite and for the ratio of 4.29 and 7.29, it decreases the amount of portlandite, indirectly implying the increased pozzolanic activity within the system. Nanosilica also exerts beneficial effects on strength development by enhancing the overall degree of reaction thereby decreasing the amount of individual, unreacted fly ash particles.

Overall, this study introduces a completely new way of activating high calcium fly ash with the zero amount of conventional portland cement and significantly reduced amount of sodium-based activators. Beyond flyash the concepts, methods, results, and strategies of this work can be similarly applied to other materials such as slag, incinerated municipal solids, rice husk, etc and generally materials that are rich in Ca, Si, Al elements and/or may have compositions similar to flyash. These findings have a noteworthy impact on current efforts in developing $CO_2$-free binder, which could be adopted in diverse industries including construction industry, refractory materials, and well cementing. (See, e.g., References 73 and 74).

Reaction Mixture to Form Binder Composition Reaction Product

The binder compositions of the present invention typically comprise the reaction product of a mixture of fly ash and other components. As an alternative or addition to be admixed with fly one may employ ash slag from steel making, residue of incinerated municipal solids, rice husk and the like. The fly ash may be Type-F fly ash or more preferably Type-C fly ash or mixtures of Type-F and Type-C fly ash. The amount of fly ash and/or alternative in the mixture varies depending upon the desired properties and other components. Typically, the fly ash, fly ash alternative, or mixture is present in an amount greater than about 65%, or greater than about 70%, or greater than about 75% of the total weight of the mixture. Preferably, the binder composition mixture comprises Type-C fly ash in an amount of from about 74% to about 82% of the total weight of the mixture.

Other components of the mixture may include, for example, calcium oxide, nanosilica, water, an effective amount of an activator, and other ingredients such as graphene, calcined coke, or a mixture thereof. The amounts of each may vary. Typically, the mixture may comprise calcium oxide in an amount of from about 10%, or from about 12, or from about 13, up to about 20%, or up to about 18% of the total weight of the mixture. The mixture may comprise nanosilica in an amount of from about 0.10%, or from about 1% up to about 8%, or up to about 5% based on the total weight of the mixture.

The activator may vary but preferably comprises a sodium based activator. Other activators that may be employed include, but are not limited to, alkali metal hydrates; salts of, for example, glycolic acid, glyceric acid, malic acid, tartaric acid, malonic acid, glutaric acid, maleic acid, formic acid, acetic acid, propionic acid, or butyric acid; In some embodiments, the activator comprises sodium silicate pentahydrate mixed with a hydroxide such as sodium hydroxide. Thus, the activator mixture may comprise a hydroxide such as sodium hydroxide in an amount of from about 0.05% to about 1% or to about 10% of the total weight of the mixture in combination with, for example, sodium silicate pentahydrate in an amount of from about 1.5% to about 6.5% of the total weight of the mixture. Advantageously, the mixture may be substantially free of calcium silicate. The amount of water may vary widely depending upon the desired setting properties. Typically, the mixture has a weight ratio of (a) water to (b) fly ash, calcium hydroxide, and nanosilica of from about 20% or from about 50% to about 75%.

The Ca/Na molar ratio may be adjusted to affect mechanical properties such as compressive strength. The Ca/Na molar ratio is typically at least 4, or at least 5, up to about 7 or up to about 6. In this manner the properties of the binder compositions such as compressive strength of the present invention may advantageously be controlled. Thus, in some embodiments the 7 day compressive strength is at least about 10 MPa, or at least about 12 MPa, or at least about 13 MPa, or at least about 14 MPa, or at least about 15 MPa, or at least about 18 MPa, or even at least about 20 Mpa or higher.

If desired for a particular application, a retarder may be employed to slow down the initial stages of strength yet still gain high strength such as compressive strength. Retarders may vary depending upon the ingredients but generally retarders may include, for example, boric oxide, sodium borate, sodium tetraborate, potassium borate and potassium tetraborate, borax pentahydrate, and borax decahydrate. In addition sodium and calcium salts of lignosulfonic acids, as well as alkali metal borates may also be used as retarders in certain formulations.

After reacting the mixture the reaction product may comprises AFm phase, katoite, calcium silicate hydrate, portlandite, or a mixture thereof.

Addition of Graphene or Calcined Coke to the Reaction Products

If desired, other ingredients may be added to the fly ash based reaction products described above to modify mechanical properties. For example, the addition of graphene in an amount of at least 0.01 wt. %, or at least 0.02 wt. %, or at least 0.03 wt. % up to about 1 wt. %, or up to 0.07 wt. %, or up to about 0.06 wt. %, or up to about 0.05 wt. %, or up to up to 1.1 wt % may enhance compressive strength of the reaction product at less than 7 days, 7 days, or beyond. Similarly, the addition of calcined coke alone or alternatively with the graphene in an amount of at least 0.04 wt. %, or at least 0.06 wt. %, or at least 0.08 wt. % up to about 0.15 wt. %, or up to about 0.12 wt. %, or up to about 0.1 wt. %, or up to about 1 wt. %, or up to about 2 wt. % may enhance compressive strength of the reaction product. In some embodiments, the compressive strength at 7, 14 and/or 28 days may increase by at least about 5%, or at least about 10%, or at least about 15%, up to about 60%, or up to about 50%, or up to about 40%. Other properties such as durability, ductility, toughness, thermal/electrical conductivity, etc. may also be improved by the addition of graphene, calcined coke, or other additives.

The above binder compositions may be employed as, for example, for structural purposes or non-load bearing construction materials such as:

Concrete production, as a substitute material for Portland cement, sand.
Fly-ash pellets which can replace normal aggregate in concrete mixture.
Embankments and other structural fills (usually for road/wall construction)
Grout and Flowable fill production
Waste stabilization and solidification
Road/Highway Pavements
Mine reclamation
Stabilization of soft soils
Road subbase construction
As aggregate substitute material (e.g. for brick production)
Mineral filler in asphaltic concrete
Agricultural uses: soil stabilization in stock feed yards, and agricultural stakes
Loose application on rivers to melt ice
Loose application on roads and parking lots for ice control Other applications include cosmetics, toothpaste, kitchen counter tops, floor and ceiling tiles, bowling balls, flotation devices, stucco, utensils, tool handles, picture frames, auto bodies and boat hulls, cellular concrete, geopolymers, roofing tiles, roofing granules, decking, fireplace mantles, cinder block, PVC pipe, structural insulated panels, house siding and trim, running tracks, blasting grit, recycled plastic lumber, utility poles and crossarms, railway sleepers, highway sound barriers, marine pilings, doors, window frames, scaffolding, sign posts, crypts, columns, railroad ties, vinyl flooring, paving stones, shower stalls, garage doors, park benches, landscape timbers, planters, pallet blocks, molding, mail boxes, artificial reef, binding agent, paints and undercoatings, metal castings, and filler in wood and plastic products.

A key advantage is that no Portland cement is needed, however, the binders may be mixed with various types of Portland cement as well.

FIG. 7 Data

Figure 7:
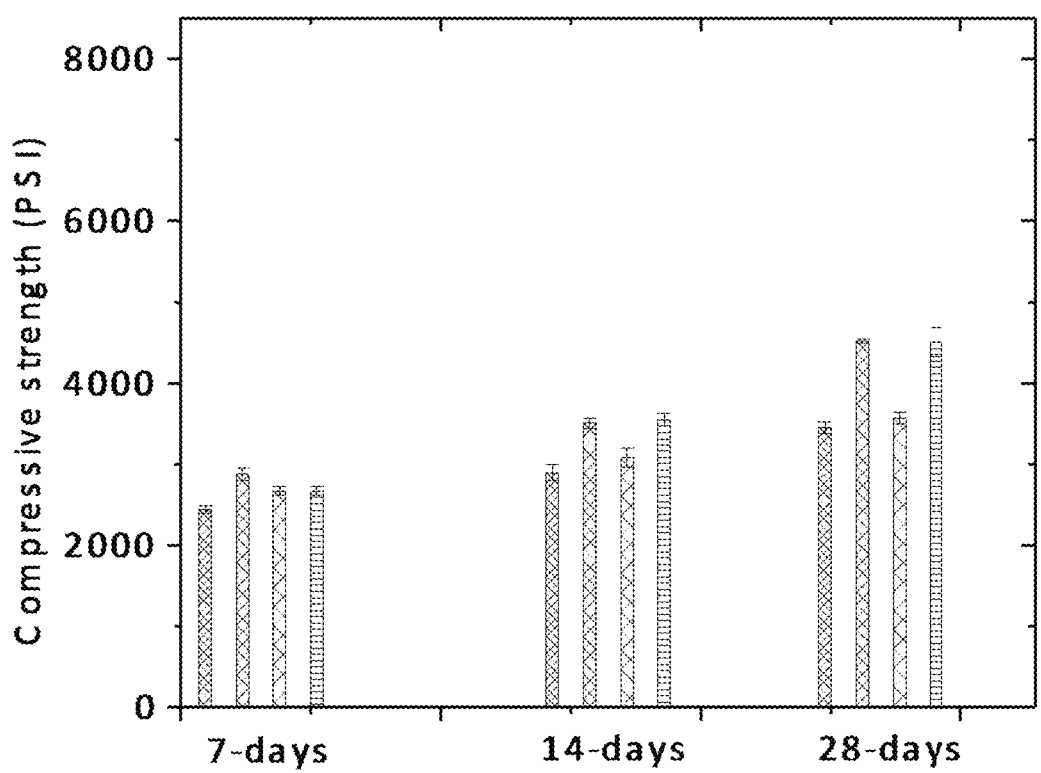
FIG. 7 is compressive strength plot showing various flyash compositions described in the example below.

FIG. 7 shows the mechanical properties of the following experiment:

In some embodiments fly ash, Calcium oxide, nanosilica were mixed together. Sodium hydroxide and sodium metasilicate pentahydrate solution were prepared using a calculated amount of water. Ash/silica were mixed with Sodium hydroxide/metasillicate solution. The paste was casted in 2" mold cubes. The cubes were taken out after 24 hours, annealed at 60° C. for 24 hours and placed in Ziploc bags until the test day at RT (1 day in mold+1 day in oven+x days in bags). The water/(fly ash+calcium oxide+nanosilica) ratio was kept at 71%, Ca/Na=5.79, and nanosilica=5 w %. Type I/II cement cubes, as control samples, were also with w/c=40%. In some embodiments, 0.035 wt % graphene and/or 0.1 wt % calcined coke were used to reinforce the above composition.

In some embodiments, the 7 day, 14 day, and/or 28 day compressive strength of the composite mixture was on par or superior to that of control samples made of purely Portland cement type II/I pastes.

REFERENCES

1. Shahsavari R, Tao L, Chen L. Structure, energetics, and impact of screw dislocations in tricalcium silicates. J Am Ceram Soc. 2016; 99:2512-20.
2. Shahsavari R, Chen L, Tao L. Edge dislocations in dicalcium silicates: experimental observations and atomistic analysis. Cement Concrete Res. 2016; 90:80-8.
3. Tao L, Shahsavari R. Diffusive, displacive deformations and local phase transformation govern the mechanics of layered crystals: the case study of tobermorite. Sci Rep. 2018; 8:6305.
4. Hwang S H, Shahsavari R. Intrinsic size effect in scaffolded porous calcium silicate particles and mechanical behavior of their self-assembled ensembles. ACS Appl Mater Interfaces. 2018; 10: 890-9.
5. Shahsavari R, Sakhavand N. Hybrid cementitious materials: nanoscale modeling and characterization. In: Loh K J, Nagarajaiah S, eds. *Innovative developments of advanced multifunctional nanocomposites in civil and structural engineering*. Cambridge, Mass.: Woodhead Publishing; 2016.
6. Mishra R K, Mohamed A K, Geissbuhler D, Manzano H, Jamil T, Shahsavari R, et al. cemff: a force field database for cementitious materials including validations, applications and opportunities. Cement Concrete Res. 2017; 102:68-89.
7. Biemacki J J, Bullard J W, Sant G, Brown K, Glasser F P, Jones S, et al. Cements in the 21st century: challenges, perspectives, and opportunities. J Am Ceram Soc. 2017; 100:2746-73.
8. Shahsavari R, Hwang S H. Innovative concretes provide the ultimate solution for rising construction costs and environmental footprint. Am Ceram Soc Bull. 2018; 97:24-30.
9. Zhang N, Shahsavari R. Balancing strength and toughness of calcium-silicate-hydrate via random nanovoids and particle inclusions: atomistic modeling and statistical analysis. J Mech Phys Solids. 2016; 96:204-22.
10. Gawwad H A A, Abd El-Aleem S, Faried A S. Influence of nano-silica and -metakaolin on the hydration characteristics and microstructure of air-cooled slag-blended cement mortar. Geosyst Eng. 2017; 20:276-85.
11. Worrell E, Price L, Martin N, Hendriks C, Meida L O. Carbon dioxide emissions from the global cement industry. Annu Rev Energy Env. 2001; 26:303-29.
12. Land G, Stephan D. The influence of nano-silica on the hydration of ordinary Portland cement. J Mater Sci. 2012; 47:1011-7.
13. Zhang N, Carrez P, Shahsavari R. Screw-dislocation-induced strengthening-toughening mechanisms in complex layered materials: the case study of tobermorite. ACS Appl Mater Interfaces. 2017; 9:1496-506.
14. Moghaddam S E, Hejazi V, Hwang S H, Sreenivasan S, Miller J, Shi B H, et al. Morphogenesis of cement hydrate. J Mater Chem A. 2017; 5:3798-811.
15. Hwang S H, Miller J B, Shahsavari R. Biomimetic, strong, tough, and self-healing composites using universal sealant-loaded, porous building blocks. ACS Appl Mater Interfaces. 2017; 9:37055-63.
16. Higashiyama H, Sappakittipakorn M, Mizukoshi M, Takahashi O. Efficiency of ground granulated blast-furnace slag replacement in ceramic waste aggregate mortar. Cement Concrete Comp. 2014; 49:43-9.
17. Torkaman J, Ashori A, Momtazi A S. Using wood fiber waste, rice husk ash, and limestone powder waste as 17. cement replacement materials for lightweight concrete blocks. Constr Build Mater. 2014; 50:432-6.
18. Canpolat F, Yilmaz K, Kose M M, Sumer M, Yurdusev M A. Use of zeolite, coal bottom ash and fly ash as replacement materials in cement production. Cement Concrete Res. 2004; 34:731-5.
19. The American Coal Ash Association (ACAA). *Coal Combustion products utilization: U.S. historical perspective and forecast.* Alexandria, Va.: The American Coal Ash Association (ACAA); 2015: 9.
20. Jerath S, Hanson N. Effect of fly ash content and aggregate gradation on the durability of concrete pavements. J Mater Civil Eng. 2007; 19:367-75.
21. Poon C S, Lam L, Wong Y L. A study on high strength concrete prepared with large volumes of low calcium fly ash. Cement Concrete Res. 2000; 30:447-55.
22. Thomas M. Optimizing the use of fly ash in concrete. Portland Cement Assoc Rep. 2007; 2007:4.
23. Shaikh F U A, Supit S W M. Compressive strength and durability properties of high volume fly ash (HVFA) concretes containing ultrafine fly ash (UFFA). Constr Build Mater. 2015; 82:192-205.
24. Thomas M. Optimizing the use of fly ash in concrete. Portland Cement Assoc Rep. 2007; 2007:1.
25. Panias D, Giannopoulou I P, Perraki T. Effect of synthesis parameters on the mechanical properties of fly ash-based geopolymers. Colloid Surface A. 2007; 301: 246-54.
26. Guo X L, Shi H S, Dick W A. Compressive strength and microstructural characteristics of class C fly ash geopolymer. Cement Concrete Comp. 2010; 32:142-7,
27. Kim M S, Jun Y, Lee C, Oh J E. Use of CaO as an activator for producing a price-competitive non-cement structural binder using ground granulated blast furnace slag. Cement Concrete Res. 2013; 54:208-14.
28. Jeon D, Jun Y, Jeong Y, Oh J E. Microstructural and strength improvements through the use of $Na_2CO_3$ in a cementless $Ca(OH)_2$-activated Class F fly ash system. Cement Concrete Res. 2015; 67:215-25.
29. Yang K H, Cho A R, Song J K, Nam S H. Hydration products and strength development of calcium hydroxide-based alkali-activated slag mortars. Constr Build Mater. 2012; 29:410-9.
30. Antiohos S, Papageorgiou A, Tsimas S. Activation of fly ash cementitious systems in the presence of quicklime. Part II: nature of hydration products, porosity and microstructure development. Cement Concrete Res. 2006; 36:2123-31.
31. Williams P J, Biemacki J J, Walker L R, Meyer H M, Rawn C J, Bai J M. Microanalysis of alkali-activated fly ash-CH pastes. Cement Concrete Res. 2002; 32:963-72.
32. Shi C J. Early microstructure development of activated lime-fly ash pastes. Cement Concrete Res. 1996; 26:1351-9.
33. Bagheri A, Nazari A. Compressive strength of high strength class C fly ash-based geopolymers with reactive granulated blast furnace slag aggregates designed by Taguchi method. Mater Des. 2014; 54:483-90.
34. Olivia M, Nikraz H. Properties of fly ash geopolymer concrete designed by Taguchi method. Mater Des. 2012; 36:191-8.
35. Hinislioglu S, Bayrak O U. Optimization of early flexural strength of pavement concrete with silica fume and fly ash by the Taguchi method. Civ Eng Environ Syst. 2004; 21:79-90.
36. Panagiotopoulou C, Tsivilis S, Kakali G. Application of the Taguchi approach for the composition optimization of alkali activated fly ash binders. Constr Build Mater. 2015; 91:17-22.
37. Hou Y F, Wang D M, Zhou W J, Lu H B, Wang L. Effect of activator and curing mode on fly ash-based geopolymers. J Wuhan Univ Technol Mat Sci Edit. 2009; 24:711-5.
38. Leong H Y, Ong D E L, Sanjayan J G, Nazari A. The effect of different $Na_2O$ and $K_2O$ ratios of alkali activator on compressive strength of fly ash based-geopolymer. Constr Build Mater. 2016; 106:500-11.
39. Ryu G S, Lee Y B, Koh K T, Chung Y S. The mechanical properties of fly ash-based geopolymer concrete with alkaline activators. Constr Build Mater. 2013; 47:409-18.
40. Ganesh P, Murthy A R, Kumar S S, Reheman M M S, Iyer N R. Effect of nanosilica on durability and mechanical properties of high-strength concrete. Mag Concrete Res. 2016; 68:229-36.
41. Hou P K, Kawashima S, Wang K J, Corr D J, Qian J S, Shah S P. Effects of colloidal nanosilica on rheological and mechanical properties of fly ash-cement mortar. Cement Concrete Comp. 2013; 35:12-22.
42. Zhang M H, Islam J. Use of nano-silica to reduce setting time and increase early strength of concretes with high volumes of fly ash or slag. Constr Build Mater. 2012; 29:573-80.
43. Singh L P, Karade S R, Bhattacharyya S K, Yousuf M M, Ahalawat S. Beneficial role of nanosilica in cement based materials—A review. Constr Build Mater. 2013; 47:1069-77.
44. Swanepoel J C, Strydom C A. Utilisation of fly ash in a geopolymeric material. Appl Geochem. 2002; 17:1143-8.
45. Shekhovtsova J, Kearsley E P, Kovtun M. Effect of activator dosage, water-to-binder-solids ratio, temperature and duration of elevated temperature curing on the compressive strength of alkali-activated fly ash cement pastes. J S Afr Inst Civ Eng. 2014; 56:44-52.
46. Riahi S, Nazari A. The effects of nanoparticles on early age compressive strength of ash-based geopolymers. Ceram Int. 2012; 38:4467-76.
47. Bakharev T. Geopolymeric materials prepared using Class F fly ash and elevated temperature curing. Cement Concrete Res. 2005; 35:1224-32.
48. Chindaprasirt P, Chareerat T, Sirivivatnanon V. Workability and strength of coarse high calcium fly ash geopolymer. Cement Concrete Comp. 2007; 29:224-9.
49. Criado M, Fernandez-Jimenez A, de la Torre A G, Aranda M A G, Palomo A. An XRD study of the effect of the $SiO_2/Na_2O$ ratio on the alkali activation of fly ash. Cement Concrete Res. 2007; 37:671-9.
50. Criado M, Fernandez-Jimenez A, Palomo A. Alkali activation of fly ash: effect of the $SiO_2/Na_2O$ ratio Part I: fTIR study. Microporous Mesoporous Mater. 2007; 106: 180-91.
51. Bignozzi M C, Manzi S, Natali M E, Rickard W D A, van Riessen A. Room temperature alkali activation of fly ash: the effect of $Na_2O/SiO_2$ ratio. Constr Build Mater. 2014; 69:262-70.
52. Criado M, Fernandez-Jimenez A, Palomo A, Sobrados I, Sanz J. Effect of the $SiO_2/Na_2O$ ratio on the alkali activation of fly ash. Part II: Si-29 MAS-NMR Survey. Microporous Mesoporous Mater. 2008; 109:525-34.
53. Yang W H, Tarng Y S. Design optimization of cutting parameters for turning operations based on the Taguchi method. J Mater Process Technol. 1998; 84:122-9.

54. Chaulia P K, Das R. Process parameter optimization for fly ash brick by Taguchi method. Mater Res-Ibero-Am J. 2008; 11:159-64.
55. Li G, LeBescop P, Moranville M. The U phase formation in cement-based systems containing high amounts of $Na_2SO_4$. Cement Concrete Res. 1996; 26:27-33.
56. Li G, LeBescop P, Moranville M. Expansion mechanism associated with the secondary formation of the U phase in cement-based systems containing high amounts of $Na_2SO_4$. Cement Concrete Res. 1996; 26:195-201.
57. Bjornstrom J, Martinelli A, Matic A, Borjesson L, Panas I. Accelerating effects of colloidal nano-silica for beneficial calcium-silicate-hydrate formation in cement. Chem Phys Lett. 2004; 392:242-8.
58. Shaikh F U A, Supit S W M, Sarker P K. A study on the effect of nano silica on compressive strength of high volume fly ash mortars and concretes. Mater Des. 2014; 60:433-42.
59. Ukrainczyk N, Matusinovic T, Kurajica S, Zimmermann B, Sipusic J. Dehydration of a layered double hydroxide—$C_2AH_8$. Thermochim Acta. 2007; 464:7-15.
60. Scrivener K L. Calcium aluminate cements. In: *Advanced concrete technology I: constituent materials*. Newman J, Choo B S (eds). Burlington, Mass.: Butterworth-Heinemann; 2003.
61. Hidalgo A, Garcia J L, Alonso M C, Fernandez L, Andrade C. Microstructure development in mixes of calcium aluminate cement with silica fume or fly ash. J Therm Anal Calorim. 2009; 96:335-45.
62. Yu P, Kirkpatrick R J, Poe B, McMillan P F, Cong X D. Structure of calcium silicate hydrate (C—S—H): near-, mid-, and far-infrared spectroscopy. J Am Ceram Soc. 1999; 82:742-8.
63. Ismail I, Bernal S A, Provis J L, Nicolas R S, Hamdan S, van Deventer J S J. Modification of phase evolution in alkali-activated blast furnace slag by the incorporation of fly ash. Cement Concrete Comp. 2014; 45:125-35.
64. Kontoleontos F, Tsakiridis P E, Marinos A, Kaloidas V, Katsioti M. Influence of colloidal nanosilica on ultrafine cement hydration: physicochemical and microstructural characterization. Constr Build Mater. 2012; 35:347-60.
65. Ahmari S, Ren X, Toufigh V, Zhang L Y. Production of geopolymeric binder from blended waste concrete powder and fly ash. Constr Build Mater. 2012; 35:718-29.
66. Fernández-Carrasco L, Torrens-Martin D, Morales L M, Martinez-Ramirez S. Infrared spectroscopy in the analysis of building and construction materials. In: Theophile, T, eds. *Infrared spectroscopy—materials science, engineering and technology*. Rijeka, Croatia:InTech; 2012.
67. Ben Haha M, Le Saout G, Winnefeld F, Lothenbach B. Influence of activator type on hydration kinetics, hydrate assemblage and microstructural development of alkali activated blast-furnace slags. Cement Concrete Res. 2011; 41:301-10.
68. Stutzman P E, Clifton J R, editors. Specimen Preparation for Scanning Electron Microscopy. Proceedings of the Twenty-First International Conference on Cement Microscopy, International Cement Microscopy Association; 1999; Las Vegas, Nev.
69. Rossen J E, Scrivener K L. Optimization of SEM-EDS to determine the C-A-S—H composition in matured cement paste samples. Mater Charact. 2016; 123:294-306.
70. Kutchko B G, Kim A G. Fly ash characterization by SEM-EDS. Fuel. 2006; 85:2537-44.
71. Walkley B, Nicolas R S, Sani M A, Bernal S A, van Deventer J S J, Provis J L. Structural evolution of synthetic alkali-activated CaO—MgO—$Na_2O$—$Al_2O_3$—$SiO_2$ materials is influenced by Mg content. Cement Concrete Res. 2017; 99:155-71.
72. Rossen J E, Scrivener K L. Optimization of SEM-EDS to determine the C-A-S—H composition in matured cement paste samples. Mater Charact. 2017; 123:294-306.
73. Kim N D, Metzger A, Hejazi V, Li Y L, Kovalchuk A, Lee S K, et al. Microwave heating of functionalized graphene nanoribbons in thermoset polymers for wellbore reinforcement. ACS Appl Mater Interfaces. 2016; 8:12985-91.
74. Shahsavari R. Intercalated hexagonal boron nitride/silicates as bilayer multifunctional ceramics. ACS Appl Mater Interfaces. 2018; 10:2203-9.
75. Lloyd R R, van Provis J L, Deventer J S J. Microscopy and microanalysis of inorganic polymer cements. 1: remnant fly ash particles. J Mater Sci. 2009; 44:608-19.
76. Walkley B, San Nicolas R, Sani M A, Rees G J, Hanna J V, van Deventer J S J, et al. Phase evolution of C—(N)-A-S—H/N-A-S—H gel blends investigated via alkali-activation of synthetic calcium aluminosilicate precursors. Cement Concrete Res. 2016; 89:120-35.

What is claimed is:

1. A cementless binder composition comprising the reaction product of a mixture comprising:
   fly ash, calcium oxide, nanosilica, water, and an effective amount of an activator to activate the mixture; wherein the mixture further comprises graphene, calcined coke, or a mixture thereof.
2. The binder composition of claim 1 wherein the compressive strength is at least about 10 MPa.
3. The binder composition of claim 1 wherein the compressive strength is at least about 15 MPa.
4. The binder composition of claim 1 which is substantially free of calcium silicate.
5. The binder composition of claim 1 wherein the activator is a sodium-based activator and wherein the Ca/Na molar ratio in the binder composition is from about 4 to about 7.
6. The binder composition of claim 1 wherein the mixture comprises nanosilica in an amount of from about 1% to about 8% based on the total weight of the mixture.
7. The binder composition of claim 1 wherein the reaction product comprises AFm phase, katoite, calcium silicate hydrate, portlandite, or a mixture thereof.
8. The binder composition of claim 1 wherein the fly ash is Type-C fly ash.
9. The binder composition of claim 1 wherein the mixture comprises fly ash in an amount greater than about 65% of the total weight of the mixture.
10. The binder composition of claim 1 wherein the mixture comprises fly ash in an amount greater than about 75% of the total weight of the mixture.
11. The binder composition of claim 1 wherein the activator comprises a mixture of sodium hydroxide and sodium metasilicate pentahydrate.
12. The binder composition of claim 1 wherein the mixture comprises Type-C fly ash in an amount of from about 74% to about 82% of the total weight of the mixture.
13. The binder composition of claim 1 wherein the mixture comprises calcium oxide in an amount of from about 10% to about 20% of the total weight of the mixture.
14. The binder composition of claim 1 wherein the mixture comprises nanosilica in an amount of from about 0.10% to about 5% of the total weight of the mixture.
15. The binder composition of claim 1 wherein the mixture comprises sodium hydroxide in an amount of from about 0.05% to about 1% of the total weight of the mixture.

16. The binder composition of claim 1 wherein the mixture comprises sodium silicate pentahydrate in an amount of from about 1.5% to about 6.5% of the total weight of the mixture.

17. The binder composition of claim 1 wherein the mixture further comprises calcium hydroxide and wherein the amount of water in the mixture is from about 20% to about 75% by weight.

18. The binder composition of claim 1 wherein said composition is employed for structural purposes and non-load bearing construction materials selected from concrete production, fly-ash pellets, embankments and other structural fills for road/wall construction, grout and flowable fill production, waste stabilization and solidification, mine reclamation, stabilization of soft soils, road subbase construction, road/highway pavements, aggregate substitute material, brick production, mineral filler in asphaltic concrete, agricultural use, soil stabilization in stock feed yards, agricultural stakes, loose application on rivers to melt ice, loose application on roads and parking lots for ice control.

* * * * *